United States Patent [19]

Weidner et al.

[11] 4,386,141

[45] May 31, 1983

[54] WATERING DEVICE FOR BATTERIES

[75] Inventors: Evert C. Weidner, Lansdale; William B. Brecht, Hatfield, both of Pa.

[73] Assignee: Exide Corporation, Philadelphia, Pa.

[21] Appl. No.: 351,048

[22] Filed: Feb. 22, 1982

[51] Int. Cl.³ .......................................... H01M 2/00
[52] U.S. Cl. ...................................... 429/64; 429/76; 137/260; 141/198
[58] Field of Search .................. 429/76, 70, 64, 61, 429/72, 80; 141/199, 198, 203, 204, 95; 137/260

[56] References Cited

U.S. PATENT DOCUMENTS

| | | | |
|---|---|---|---|
| 1,361,437 | 12/1920 | Blau | 429/64 |
| 1,467,966 | 11/1921 | Watzman | 429/64 |
| 3,052,745 | 9/1959 | Frankmann | 136/162 |
| 3,189,063 | 8/1962 | Lowe | 144/199 |
| 3,550,651 | 12/1970 | McKellen | 141/198 |
| 4,154,904 | 9/1977 | Michael | 429/64 |
| 4,353,968 | 10/1982 | Boyle | 429/76 X |

FOREIGN PATENT DOCUMENTS 1499914 12/1975 United Kingdom .

OTHER PUBLICATIONS

VARTA Aquamatic® topping up advertising literature (date unknown).

*Primary Examiner*—Charles F. LeFevour
*Attorney, Agent, or Firm*—Raymond J. Kenny; Edward A. Steen

[57] ABSTRACT

A watering device (10) for maintaining a predetermined electrolyte level in the cells of a battery. The device includes a plug body (72) consisting of a cover (12), a valve housing (14) and a float guide (16). A valve (22) is disposed within the body (72) to modulate the quantity of water entering each cell. A float (18) movably communicates with the valve (22). A visual indicator (28) indicates the status of the device (10).

12 Claims, 6 Drawing Figures

WATERING DEVICE FOR BATTERIES

TECHNICAL FIELD

The instant invention relates to galvanic cells in general and more particularly to an apparatus for replenishing liquid in such cells.

BACKGROUND ART

As is well known, the electrolyte level in each cell of a lead-acid battery will diminish over a period of time. Evaporation and electrolysis eventually reduce the electrolyte to undesirably low levels. As the cells dry out, the battery becomes progressively less efficient until the dessicated battery finally cannot hold and deliver a charge, rendering it worthless.

Accordingly, the electrolyte level of the cells must be monitored at periodic intervals. After the electrolyte decreases to a predetermined level, distilled water must be introduced into each cell to replenish the supply of electrolyte. Care must also be exercised in order not to overfill each cell. An overfilled cell may prevent oxygen and hydrogen generated within the battery from safely escaping into the atmosphere. A build up of these gases may buckle the plates and possibly lead to an explosive condition. Moreover, spillage along the top surface of the battery may lead to a short circuit and/or speed the accumulation of deposits (primarily lead sulfate and lead carbonate) about the terminals thereby resulting in the degradation of battery performance.

It can be appreciated, therefore, that monitoring and servicing large arrays of lead-acid batteries is a labor intensive job. Oftentimes such batteries are left unattended for long periods of time. Even with the introduction of the new so-called "low maintenance" or "maintenance-free" battery alloys, it is expected that the cells will still require some attention.

Over the years, a number of topping-up systems have been developed. See for example, U.S. Pat. No. 1,361,437; No. 1,467,966; No. 3,052,745; No. 3,189,063; No. 3,550,651; No. 4,154,904 and U.K. Pat. No. 1,499,914.

SUMMARY OF THE INVENTION

Accordingly, there is provided a simple and accurate device for monitoring and modulating the quantity of electrolyte in a lead-acid battery. Each cell is provided with a plug which is inserted into the vent holes of a battery cover. A number of plugs may be ganged together to a common water supply.

Each plug includes a float communicating with an O-ring valve disposed within the plug body. A gas venting cap and means for supplying water to the plug are incorporated into the cover of the plug. A valve position display may be further disposed in the cover.

PREFERRED MODE FOR CARRYING OUT THE INVENTION

Figure 1:
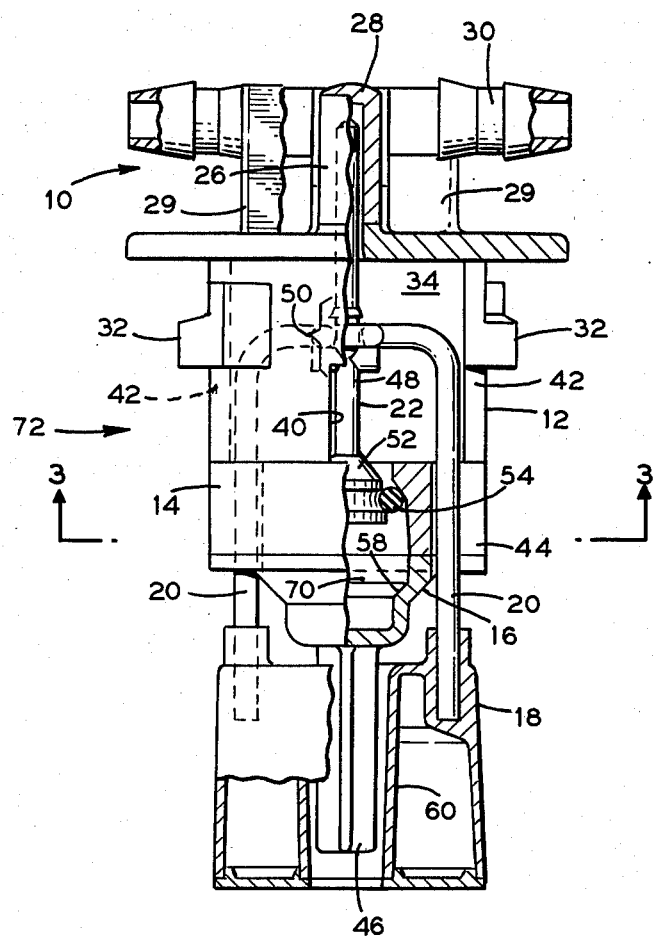
FIG. 1 is an elevation of the invention partially cut away.
Figure 2:
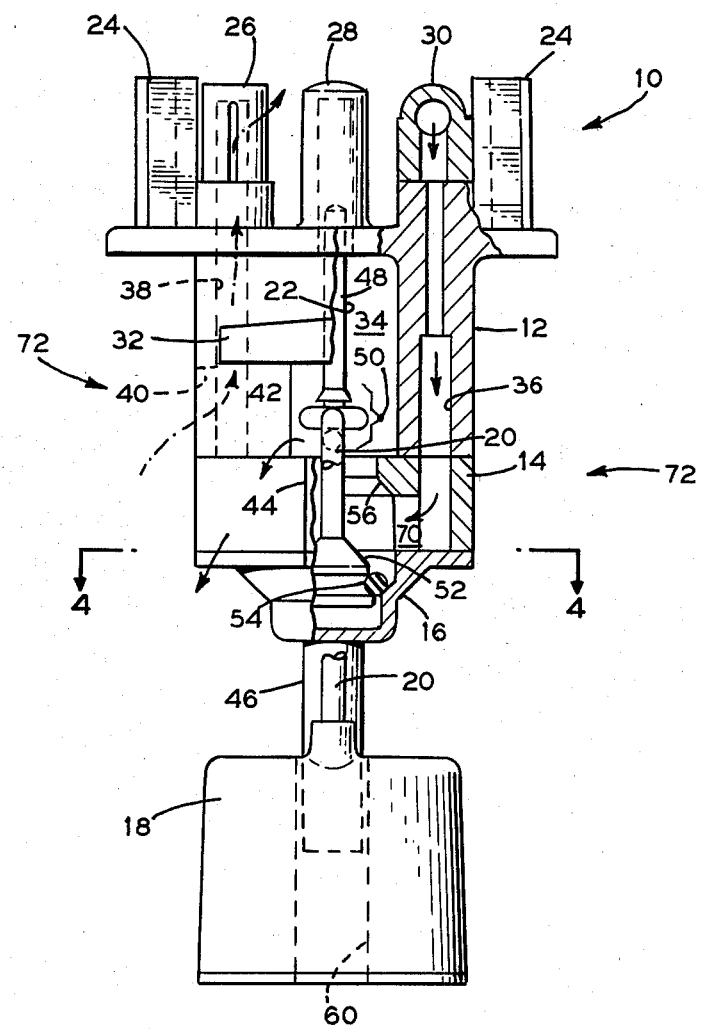
FIG. 2 is an elevation of the invention partially cut away.

Referring to FIGS. 1 and 2, there is shown a watering device 10. Taking FIG. 1 as a point of reference, FIG. 2 depicts the device 10 rotated ninety degrees (90°) to the left. Moreover, FIG. 1 depicts the device 10 in the closed (no water flow) position whereas FIG. 2 shows the device 10 in the open (water flow) position.

The device 10 consists of cover 12, valve housing 14, float guide 16 and float 18. The float 18 is attached to yoke 20 which in turn movably communicates with valve 22. For the purposes of this discussion, the cover 12, the valve housing 14, and the float guide 16 constitute plug body 72.

Figure 5:
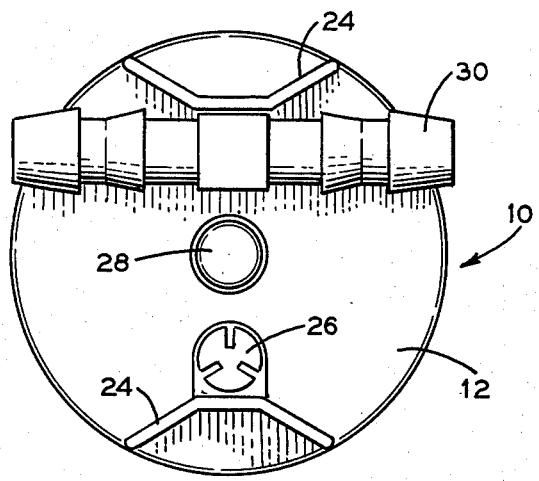
FIG. 5 is an upper plan view of the invention.
Figure 6:
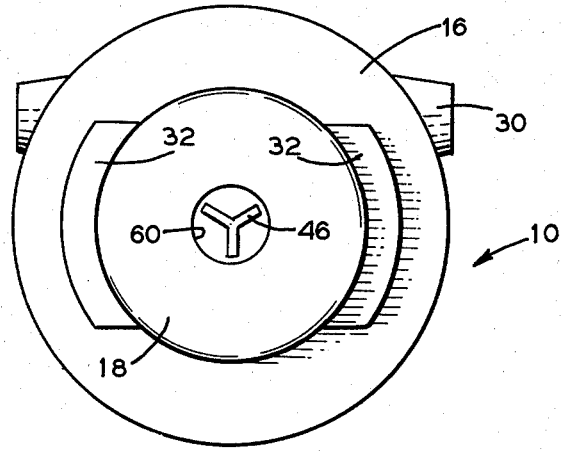
FIG. 6 is a lower plan view of the invention.

The upper portion of the cover 12 includes (see also FIG. 5) finger grabs 24, gas vent cap 26, viewer 28 and connecting tee 30. The exterior of the plug 72 includes a pair of bayonet mounts 32. The interior of the plug 72 consists of valve stem chamber 34, water passage 36 (see also FIG. 3) and gas channel 38. The gas channel 38 communicates with gas slot 40 and vent cap 26. Two water flow openings 42 are disposed below the mounts 32.

The valve housing 14 continues the water passage 36 into valve seat chamber 70. The chamber 70 consists of the valve housing 14 and the float guide 16. Disposed below the openings 42 are a pair of yoke guides 44. The guides 44 continue into the float guide 16. The float guide 16 includes slide 46. The float 18 includes a hollow central core 60 which fits over the slide 46.

The valve 22 includes valve stem 48, yoke retainer 50 and valve head 52. A pliant O-ring 54 circumscribes the valve head 52.

Figure 3:
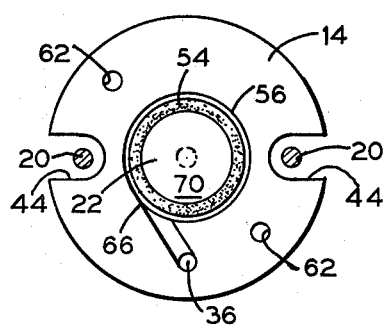
FIG. 3 is a view taken along line 3—3 of FIG. 1.
Figure 4:
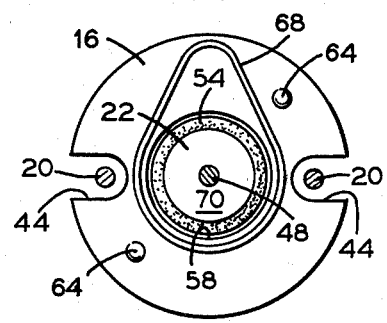
FIG. 4 is a view taken along line 4—4 of FIG. 2.

FIGS. 3 and 4 are detailed views of the upper portion of the valve seat chamber 70 (in reality the valve housing 14) and the lower portion of the valve seat chamber 70 (in reality the float guide 16) respectively. The valve housing 14 includes a tapered upper valve seat 56 and a swirl chamber 66 communicating with the water passage 36. The float guide 16 has a tapered lower valve seat 58 and a sealing rim 68 that compliments the swirl chamber 66 and prevents leakage. In order to ensure proper positioning during assembly, the housing 14 is equipped with a pair of apertures 62 whereas the guide 16 has a pair of nubs 64. The nubs 64 engage the apertures 62.

Inasmuch as the device 10 is exposed to a sulfuric acid environment, the component parts must be resistant to acid attack. Accordingly, it is preferred to utilize high impact polystyrene or polypropylene.

The invention and the manner of applying it may perhaps be better understood by a brief discussion of the principles underlying the invention.

As was discussed previously, the electrolyte level of a lead-acid battery must be maintained in a relatively narrow range. Constant vigilence is required in order to ensure battery life. The watering device 10 automatically maintains the requisite level.

The device 10 is inserted via the finger grabs 24 into the vent well of each cell (not shown) and turned a quarter turn to allow the bayonet mounts 32 to engage the corresponding members (not shown) disposed in the vent well.

The float 18 floats in the electrolyte. As the electrolyte level diminishes, the float 18, stradling the slide 46, will likewise sink. Due to the mechanical linkage between the float 18 and the yoke 20, the valve will correspondingly fall the same distance through the valve seat chamber 70. Depending on the electrolyte level, the O-ring 54 may come to rest upon the lower valve seat 58 (fully open). This permits a quantity of water to flow down the water passage 36 (from the tee 30) through the chamber 70, then out through the openings 42 and subsequently into the cell, thereby raising the electrolyte level. The non-broken arrows indicate the water flow path. See FIG. 2.

As the electrolyte level continues to rise, the float 18 will rise, ultimately causing the valve 22 to seat the O-ring 54 against the upper valve seat 56, thereby positively shutting off the supply of water to the cell. See FIG. 1. Of course, the valve 22 may only fall to an intermediate position within the chamber 70 before rising and closing the device 10.

The valve housing 14 incorporates the swirl chamber 66 to center the stem 48 when water is first introduced into the device 10. By imparting a twist to the water as it enters the valve seat chamber 70, and thereby preventing turbulence, the valve 22 will not prematurely rise and shut off the device 10 before the proper time.

The water enters the chamber 70 tangentially to the central axis of the device 10. That is, the water swirls into the chamber 70 and follows the chamber 70 wall in a laminar (as opposed to a turbulent) flow and creates the dynamic stability necessary for it to flow past and over the valve head 52 in a controlled manner thereby holding the valve stem 48 in a central position so it can function properly.

This control of water flow is critical since a turbulent condition may momentarily generate a low pressure site under the valve head 52. This underpressure tends to relieve itself by drawing water under the valve 22 and, as result, lifting the valve 22 to prematurely close off the device 10.

The O-ring 54 and the geometry of the upper and lower valve seats 56 and 58 are carefully matched to provide positive closure and opening of the device 10. Leakage will be minimized while providing positive modulated control over cell watering.

Gases generated within the cell during battery operation will pass into the gas slot 40, up through the gas channel 38 and out into the atmosphere from the gas vent cap 26. Broken arrows trace the gas flow.

The viewer 28 affords an operator an opportunity to assess the status of the device 10 and the cell. When the stem 48 is fully extended into the viewer 28, the valve is closed and the electrolyte level is at its maximum desirable height. When the stem 48 is partially present or absent from the viewer 28, the valve 22 is open, filling the cell to the desired level. The viewer 28 provides external verification that the device 10 is operating. Additionally, the health of a particular cell may be easily monitored. During normal operation, the valve 22 will be gradually hunting; slowly falling and filling the cell and then rising and closing off the water supply. Should a cell require constant refilling, a condition that may indicate a troublesome cell, the operator may soon become aware of the problem and rectify the situation.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A watering device for maintaining a predetermined electrolyte level in a cell, the device having a central axis and comprising a plug body having a cover and a valve chamber disposed within the plug body, a valve disposed within the plug body, the valve including a valve head, the valve head disposed within the valve chamber, the valve chamber including an upper valve seat and a lower valve seat, an O-ring circumscribing the valve head, the O-ring movably disposed between the upper valve seat and the lower valve seat to create a positively closed and a positively opened valve position respectively, means for introducing water into the valve chamber, means for introducing the water from the valve chamber into the cell, means for permitting gas to exit from the cell, and float means in movable communication with the valve and the electrolyte.

2. The device according to claim 1 wherein the valve chamber includes a swirl chamber for introducing water into the valve chamber tangentially to the central axis to center the valve.

3. The device according to claim 1 further comprising means for indicating the position of the valve.

4. The device according to claim 1 wherein the valve includes a stem, and the valve head disposed at one end thereof.

5. The device according to claim 4 wherein an opening is provided in the cover, and the stem is movably extendable into the opening.

6. The device according to claim 5 wherein the cover includes a clear member covering the opening and sized to accommodate the stem.

7. The device according to claim 1 wherein the valve chamber includes an upper valve seat and a lower valve seat, and the O-ring nestable against each valve seat.

8. The device according to claim 1 wherein the plug body includes a plurality of water outflow openings communicating with the interior of the plug body.

9. The device according to claim 1 wherein a yoke connects the float to the valve, the yoke passing through the plug body.

10. The device according to claim 1 wherein a gas passage, disposed within the plug body transmits gas from the cell to the exterior of the cell.

11. The device according to claim 1 wherein the cover includes means for supplying water to the device and a gas venting cap.

12. The device according to claim 1 wherein the plug body includes a plurality of bayonet mounting members.

* * * * *